(12) United States Patent
Zielinger et al.

(10) Patent No.: US 10,690,149 B2
(45) Date of Patent: Jun. 23, 2020

(54) TURBINE ENGINE PART WITH NON-AXISYMMETRIC SURFACE

(71) Applicant: Safran Aircraft Engines, Paris (FR)

(72) Inventors: Vincent Benoit Zielinger, Moissy-Cramayel (FR); William Henri Joseph Riera, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 281 days.

(21) Appl. No.: 15/831,706

(22) Filed: Dec. 5, 2017

(65) Prior Publication Data

US 2018/0156239 A1  Jun. 7, 2018

(30) Foreign Application Priority Data

Dec. 5, 2016 (FR) .................................... 16 61945

(51) Int. Cl.
*F04D 29/68* (2006.01)
*F01D 9/04* (2006.01)
(Continued)

(52) U.S. Cl.
CPC ........... *F04D 29/681* (2013.01); *F01D 5/143* (2013.01); *F01D 5/145* (2013.01); *F01D 5/146* (2013.01);
(Continued)

(58) Field of Classification Search
CPC ...... F04D 29/681; F04D 29/544; F01D 5/143; F01D 5/145; F01D 5/146; F01D 9/041;
(Continued)

(56) References Cited

U.S. PATENT DOCUMENTS 2,839,239 A * 6/1958 Stalker .................. F04D 29/321
  415/181
3,039,736 A * 6/1962 Pon ....................... F04D 29/682
  416/90 R
(Continued)

FOREIGN PATENT DOCUMENTS

EP  1 927 723 A1  6/2008
EP  2 194 232 A2  6/2010
(Continued)

OTHER PUBLICATIONS

French Preliminary Search Report dated Aug. 3, 2017 in French Patent Application No. 1661945 (with English translation of categories of cited documents), 3 pages.

*Primary Examiner* — David E Sosnowski
*Assistant Examiner* — Wayne A Lambert
(74) *Attorney, Agent, or Firm* — Oblon, McClelland, Maier & Neustadt, L.L.P.

(57) ABSTRACT

A turbine engine part or set of parts including at least first and second obstacles each having a leading edge and a trailing edge, and a platform from which the obstacles extend; wherein the platform has, between the pressure side of the first obstacle and the suction side of the second obstacle a non-axisymmetric surface defining at least one fin with a substantially triangular cross-section, each fin being associated with a leading position and a trailing position on the surface between which the fin extends, such that the leading position is upstream of each of the leading edges; the trailing position is downstream of each of the leading edges.

10 Claims, 5 Drawing Sheets

(51) Int. Cl.
*F01D 5/14* (2006.01)
*F04D 29/54* (2006.01)
*F02K 3/06* (2006.01)

(52) U.S. Cl.
CPC ............ *F01D 9/041* (2013.01); *F04D 29/544* (2013.01); *F02K 3/06* (2013.01); *F05D 2220/323* (2013.01); *F05D 2240/12* (2013.01); *F05D 2240/127* (2013.01); *F05D 2250/11* (2013.01); *F05D 2250/73* (2013.01); *Y02T 50/671* (2013.01); *Y02T 50/673* (2013.01)

(58) Field of Classification Search
CPC ........... F05D 2240/12; F05D 2240/126; F05D 2240/127; F05D 2220/323; F05D 2250/73; F05D 2250/11; Y02T 50/671; Y02T 50/673; F02K 3/06
See application file for complete search history.

(56) References Cited

U.S. PATENT DOCUMENTS

| | | | | |
|---|---|---|---|---|
| 3,617,147 | A * | 11/1971 | Bragg | F01D 9/041 415/195 |
| 4,023,350 | A | 5/1977 | Hovan et al. | |
| 4,420,288 | A * | 12/1983 | Bischoff | F01D 5/145 416/244 A |
| 4,785,625 | A * | 11/1988 | Stryker | F02C 7/20 60/226.1 |
| 5,203,163 | A * | 4/1993 | Parsons | F02C 6/08 60/226.1 |
| 6,213,711 | B1 | 4/2001 | Müller et al. | |
| 8,182,204 | B2 * | 5/2012 | Durocher | F01D 9/06 415/115 |
| 8,303,258 | B2 * | 11/2012 | Aubin | F01D 5/143 416/193 A |
| 8,678,760 | B2 * | 3/2014 | Clemen | F01D 5/141 415/209.1 |
| 10,385,708 | B2 * | 8/2019 | Damevin | F04D 29/667 |
| 2006/0024158 | A1 * | 2/2006 | Hoeger | F01D 5/143 415/182.1 |
| 2007/0134086 | A1 * | 6/2007 | Higashimori | F04D 29/284 415/208.3 |
| 2009/0065645 | A1 | 3/2009 | Cini | |
| 2011/0211947 | A1 * | 9/2011 | Clemen | F01D 5/141 415/211.2 |
| 2013/0259672 | A1 * | 10/2013 | Suciu | F01D 1/04 415/208.1 |
| 2015/0044038 | A1 | 2/2015 | Gier et al. | |
| 2016/0186772 | A1 * | 6/2016 | DiPietro, Jr. | F04D 29/324 416/203 |
| 2017/0009781 | A1 | 1/2017 | Maniere et al. | |
| 2017/0022835 | A1 * | 1/2017 | Clark | F01D 9/041 |
| 2018/0252231 | A1 * | 9/2018 | Northall | F01D 9/041 |

FOREIGN PATENT DOCUMENTS

| | | |
|---|---|---|
| FR | 3004749 A1 * | 10/2014 |
| JP | 6-22002 A | 1/1994 |
| WO | WO 2015/092306 A1 | 6/2015 |
| WO | WO 2016/128665 A1 | 8/2016 |

* cited by examiner

TURBINE ENGINE PART WITH NON-AXISYMMETRIC SURFACE

GENERAL TECHNICAL FIELD

The present invention relates to a turbine engine part comprising obstacles and a platform having a non-axisymmetric surface.

STATE OF THE ART

A bypass turbine engine of the type of FIG. 1 has a fan compressing a large mass of cold air, of which a portion is injected into the compressor and heated (primary flow), the rest forming a cylindrical flow (secondary flow) surrounding the engine, guided by an OGV ("Outlet Guide Vane") stage and directed to the rear to create thrust.

To this end, the turbine engine typically comprises a hub internally restricting the secondary air stream, and a casing restricting the secondary air stream externally. Arms radially connect the two (the hub is fixed with respect to the casing, and movable with respect to the central shaft), and transmit a portion of the forces between the engine and its support.

Various lead-throughs integrating components of the engine (such as an oil or fuel tube, cables, etc.) pass through the arms. Two of the arms, noticeably more massive, and generally placed at the top and at the base, are called pylons and serve as bearing structures allowing the turbine engine to be connected to an aircraft.

For matters of mass reduction and performance improvement, the arms and/or the pylons (collectively called "bifurcations") can be joined in the same structure as the OGV blades, and are then called "integrated", as can be seen in FIG. 1. More precisely, the guide vane stage comprises on its circumference the bifurcations disposed between the OGV blade sequences.

This leads to a shape of the "eagle's beak" type as can be seen in FIG. 2 (with reference to the shape of the bifurcation in proximity to its leading edge) which generates fewer losses than in the so-called "separated" configuration where the bifurcations are downstream of a ring of OGV blades. However, due to the massive character of the bifurcation it is necessary for the OGV blades to be cambered at the pressure side and de-cambered at the suction side of the bifurcation. This gives a so-called "multifamily" OGV configuration.

These multifamily OGVs allow a reduction in the distortion that comes back to the fan and to reduce the pressure losses connected with the presence of the bifurcation just downstream. However, the cambered and de-cambered blades are no longer as suitable to the aerodynamic loads on the blading as a separated OGV stage without a bifurcation downstream.

The aerodynamic load on the cambered OGV blades is higher and they do not succeed in completely deflecting the flow. This causes a suction side separation from the blade generating pressure losses.

Likewise, the inflection and strong curvature zones on the "eagle's beak" generate pressure losses at the bifurcation.

The junction zones with the hub are even more sensitive to this increase in aerodynamic loading and to these inflection and high curvature zones.

At the junction between the platforms and the different obstacles, a separation, called a "corner" separation, occurs, which generates pressure losses and reduces the stability and the operability of the turbine engine.

This corner separation phenomenon is amplified, in the case of multifamily OGVs, particularly for strongly cambered OGVs situated on the pressure side of the bifurcation.

On the bifurcations, the minimum curvature zone called the inflection zone) surrounded by a solid line in FIG. 2, and the maximum curvature zones, surrounded by a dotted line in FIG. 2, are the most impacted by these corner separation phenomena.

It is then noted that the geometries of OGV stages remain improvable, in particular in the "integrated" configurations.

It would also be desirable to dispose of a new geometry allowing a reduction in the corner separations on these shapes to as to improve performance (reduction of separation drag) and stability (reduction of boundary layer separations and associated stream obstruction).

PRESENTATION OF THE INVENTION

According to a first aspect, the present invention proposes a turbine engine part or set of parts comprising at least first and second obstacles each having a leading edge and a trailing edge, and a platform from which the obstacles extend;
characterized in that the platform has, between the pressure side of the first obstacle and the suction side of the second obstacle, a non-axisymmetric surface defining at least one fin with a substantially triangular cross-section, each fin being associated with a leading position and a trailing position on the surface, between which the fin extends, such that:
said leading position is upstream of each of the leading edges;
said trailing position is downstream of each of the leading edges.

According to other advantageous and non-limiting features:
the fin has a height comprised between 0.5% and 15% of a height of each of the obstacles, and more particularly between 0.5% and 5%;
the trailing position is situated at 50% at least of the relative length of an obstacle chord extending from the leading edge to the trailing edge of the obstacle having the most upstream trailing edge;
said trailing position is downstream of the trailing edge of the obstacle having the most upstream trailing edge;
said leading position extends upstream of each of the leading edges by up to 15% of the relative length of an obstacle chord extending from the leading edge to the trailing edge of the obstacle having the most upstream trailing edge;
one of the first and the second obstacle is a blade and the other is a bifurcation having a trailing edge downstream of the leading edge of said blade;
the bifurcation has, on its pressure side or its suction side facing said blade, a maximum curvature point downstream of the trailing edge of said blade;
said trailing position extends axially substantially to said maximum curvature point of the bifurcation;
the part comprises at least two blades, including a first blade and a second blade, the platform having at least two non-axisymmetric surfaces each defining said fin with a substantially triangular cross-section, including a first surface for which the first blade forms the first obstacle and the bifurcation forms the second obstacle, and a second surface for which the bifurcation forms the first obstacle and the second blade forms the second obstacle;

each fin has a trace corresponding to the mean skeleton line of the first and second obstacles;

the surface defines one or two fins side by side;

each of the first and second surfaces further defines a secondary fin shorter than the fin, and situated at the suction side of said fin;

the platform has an annular shape along which are regularly disposed a plurality of obstacles;

the part is a secondary flow guide vane.

According to a second aspect, the invention relates to a turbine engine comprising a part according to the first aspect previously stated.

PRESENTATION OF THE FIGURES

Other features and advantages of the present invention will appear upon reading the description that follows of a preferred embodiment. This description will be given with reference to the appended drawings in which:

FIG. 1, previously described, gives an example of a turbine engine;

FIG. 2, previously described, shows an example of a known OGV geometry integrated with a bifurcation;

DETAILED DESCRIPTION

Figure 1:
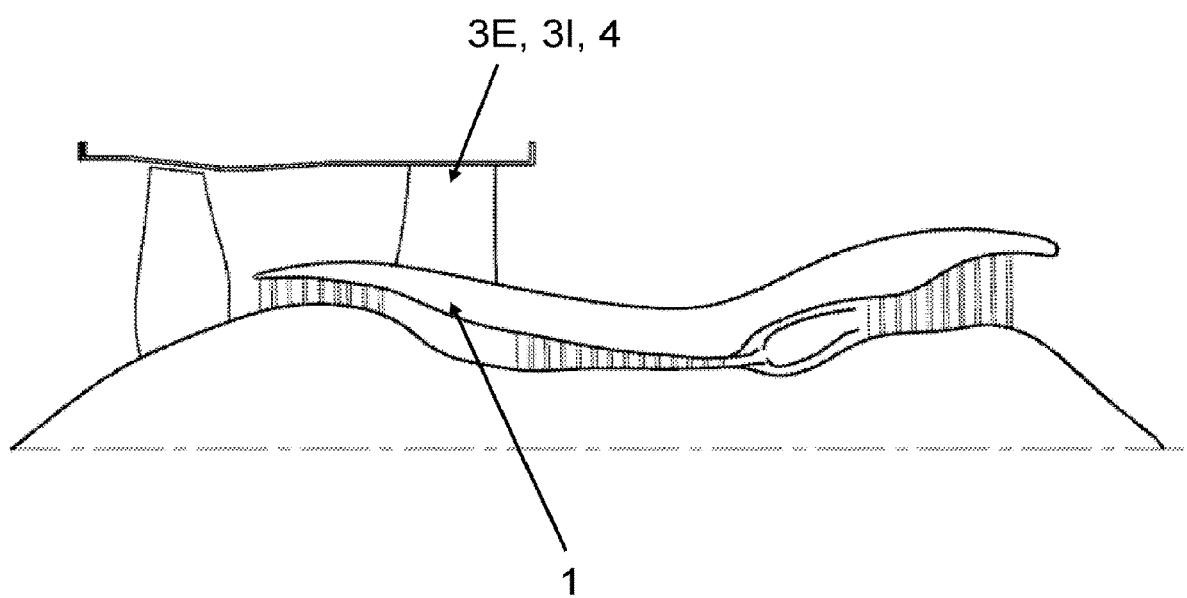
Figure 2:
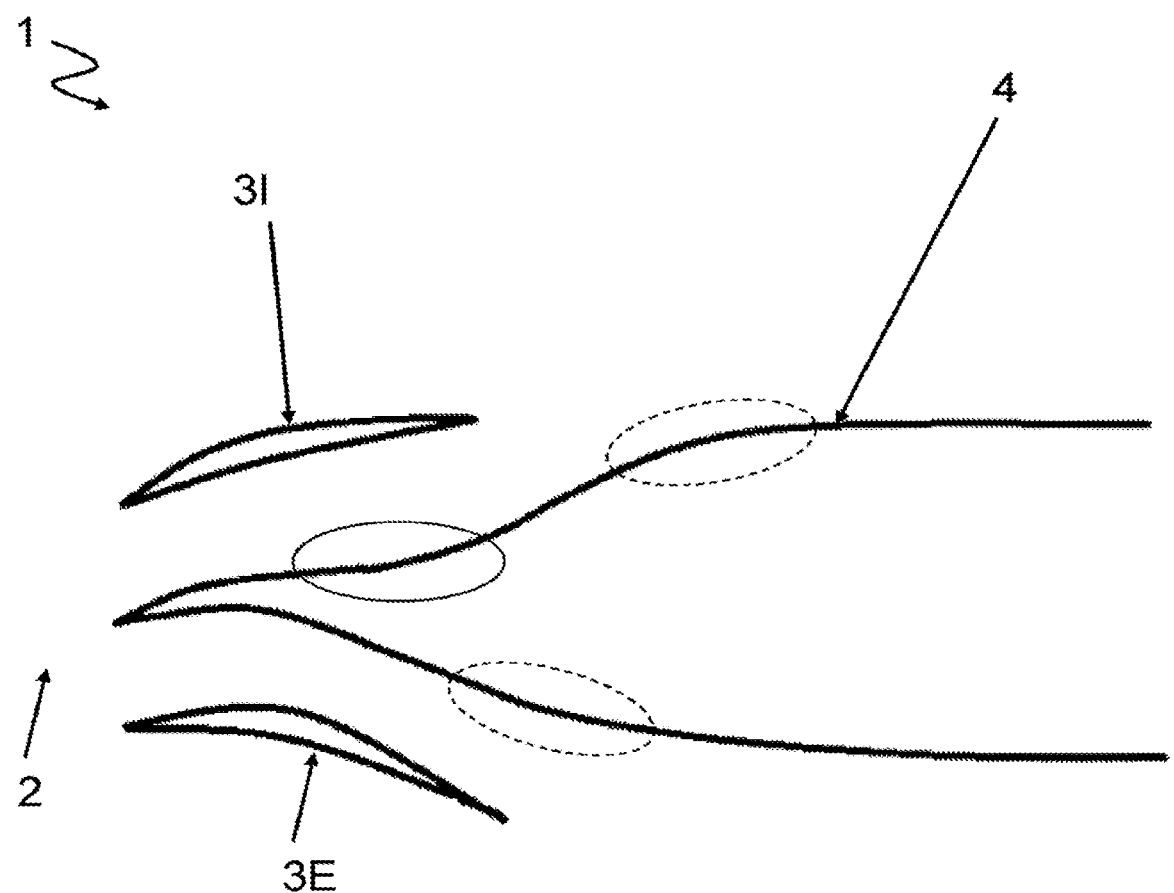

With reference to FIG. 2, the present part 1 (or set of parts if it is not a single part) of a turbine engine has, in known fashion and as explained, at least two consecutive obstacles 3E, 4, 3I and a platform 2 from which the obstacles 3E, 3, 3I extend.

A bypass turbine engine typically comprises a hub restricting the secondary air stream internally, and a casing restricting the secondary air stream externally. Arms connect the two radially, and transmit a portion of the forces between the engine and its support.

The present part or set of parts 1 is advantageously a part of a secondary flow guide vane stage, in particular a ring of fixed blades (called OGV for "outlet guide vane") disposed most often at the outlet of the rotor of the fan, and more advantageously a ring of integrated OGVs (i.e. certain of the obstacles are not blades).

Hereafter in the present description, the example of an integrated OGV stage will be used for this purpose, but a person skilled in the art will know how to transpose to other types of parts 1 (for example, a separated OGV stage or a stage of a primary flow guide vane, i.e. a compressor stator stage).

The term "obstacle" designates any element positioned across the flow of air and having an influence on its flow, having a leading edge BA, a trailing edge BF, a pressure side and a suction side.

For the most part, these are blades 3E, 3I (and in particular, in an embodiment where the part 1 is a secondary flow guide vane stage with integrated OGV, the obstacles are all blades 3E, 3I), but in a preferred embodiment where the part 1 is a secondary flow guide vane stage with integrated OGVs, at least one of the obstacles is a bifurcation 4, i.e. a larger, longer and less profiled element than the blades 3I, 3E having as explained a structural, rather than an aerodynamic function, in particular for connecting the platform 2 to a casing or a hub of the part 1 and/or the passage of leadthroughs. In particular, it will be understood that the bifurcations 4 have a trailing edge considerably downstream (with respect to the flow of fluid) from the trailing edge of the blades 3I, 3E. Moreover, on each of their suction side and their pressure side, the bifurcations 4 have a maximum curvature point (in the middle of the dotted zone in FIG. 2), generally slightly downstream of the trailing edges BF of the adjoining blades 3I, 3E.

Generally, it will be understood that the obstacles 3E, 4, 3I are selected among blades 3E, 3I and bifurcations 4, the latter possibly being of several types: arm or pylon, depending on their size and their importance to structural integrity.

In particular one or two of the bifurcations 4 are pylons, in particular, a main pylon disposed at the top of the part 1 (so-called 12 o'clock position), and/or a secondary pylon disposed at the base of the part 1 (so-called 6 o'clock position). The two pylons are thus diametrically opposed. The pylons are support elements of the entire turbine engine, in particular the main pylon which allows attachment to an aircraft.

The pylons are distinctly more massive than the possible other bifurcations of the arm type (which are themselves more massive than the blades 3E, 3I), and the main pylon is distinctly more massive than the secondary pylon). The pylons (and particularly the main pylon) have a trailing edge distinctly downstream of the trailing edge of possible other bifurcations of the arm type. The latter can be disposed, regularly or not, between the pylons.

Preferably, all the bifurcations 4 are pylons, i.e. there are no "arms", and hereafter in the present description the general case will be taken of a bifurcation 4 of the pylon type disposed between two equivalent blades 3E, 3I, but a person skilled in the art will know how to transpose the invention into any other configuration.

The term "platform" is interpreted here in the broad sense and designates generally any element of a turbine engine on which the obstacles 3E, 4, 3I are capable of being disposed protruding by extending radially and having an inner/outer wall against which the air circulates. The platform 2 generally has an annular shape along which is disposed said plurality of obstacles 3E, 4, 3I.

In particular, the platform 2 can be one-piece (and thus support all the blades of the part 1), or formed of a plurality of elementary members each supporting a single obstacle 3I, 4, 3E (a "root" of the obstacle) so as to constitute a vane.

In particular, the platform 2 can comprise a platform portion for each of the obstacles 3E, 4, 3I in an advantageous embodiment which will be described hereafter.

In addition, the platform 2 can delimit a radially interior wall of the part 1 (the air flow passes around it) by defining a hub, and/or a radially exterior wall of the part 1 (the air flow passes inside it, the obstacles 3I, 4, 3E extend toward the center), then defining a casing of the part 1. It should be noted that the same part 1 can comprise simultaneously these two types of platform 2.

Platform Surface

Figure 3:
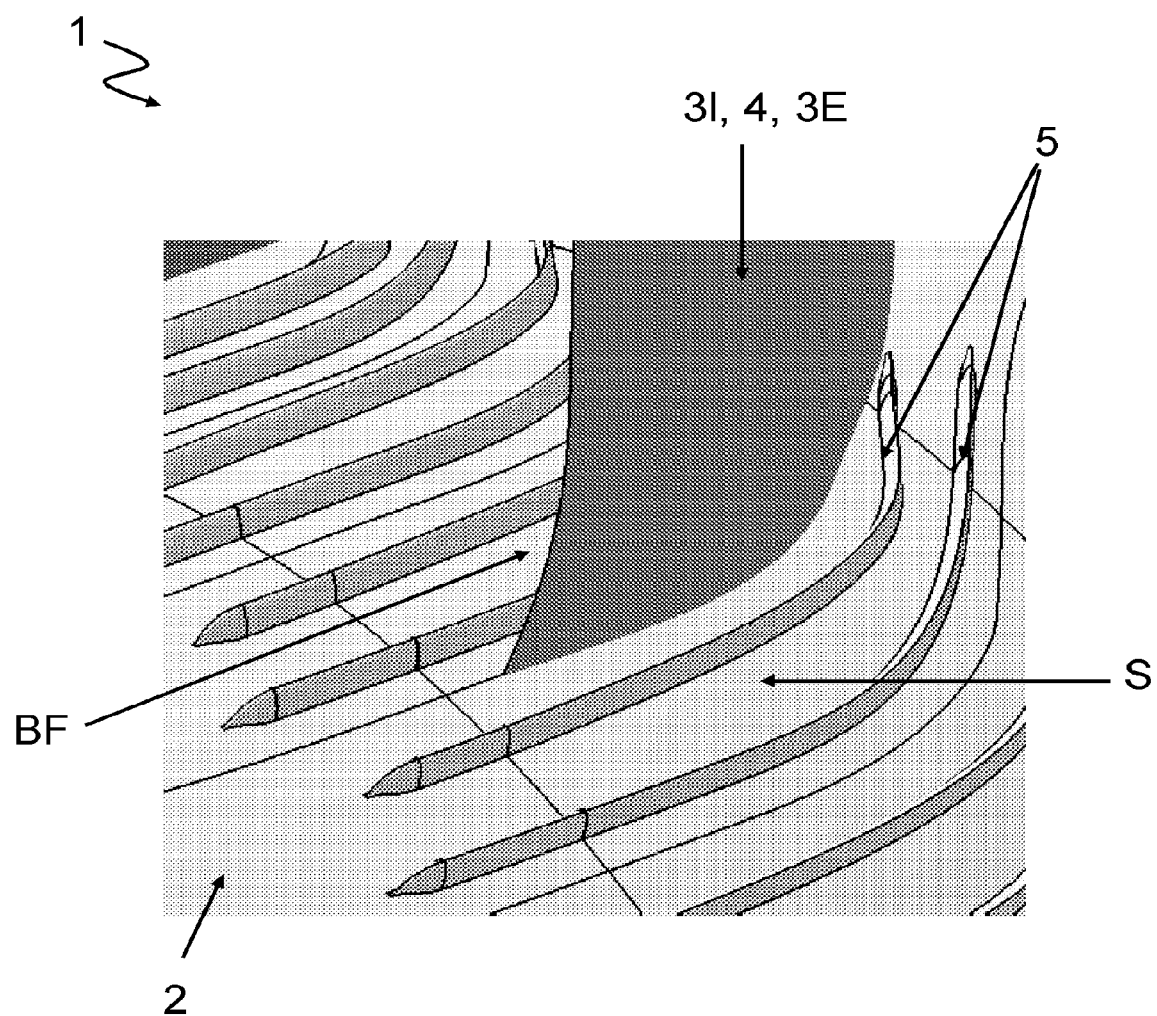
FIG. 3 shows a 3D view of an example of geometry of a part according to the invention.

The present part 1 is distinguished by a particular (non-axisymmetric) geometry of at least one surface S (advantageously at least two, with reference symbols SE, SI) of a platform 2 of the part 1, of which one advantageous modeling example is observed in FIG. 3. It will be understood that, in FIG. 3, a single central obstacle 3E, 4, 3I is visible, but other obstacles are inherently present.

Each surface S extends between two obstacles 3E, 4, 3I. The surface(s) S are in fact part of a larger surface defining a substantially toroidal shape around the part 1. Assuming (without limitation) a periodicity in the circumference of the part 1, there can be several occurrences of the various surfaces S.

A surface S is limited upstream by a first end plane, the "separation plane" and downstream by a second end plane, the "connection plane", which are each defined around an asymmetric continuous contour with a continuous derivative (the curve corresponding to the intersection between each of the end planes and the surface of the part 1 in its entirety is closed and forms a loop). The surface S has a substantially parallelogram shape and extends continuously between the two end planes and the two obstacles 3E, 4, 3I of a couple of consecutive obstacles. One of the blades of this couple is the first blade 3I, 4, or a pressure side obstacle. In fact, it has its pressure side on the surface S under consideration. The other obstacle is the second obstacle 4, 3E, or suction side obstacle. In fact, it presents its pressure side to the surface S. Every "second obstacle" 4, 3E is the "first obstacle 3I, 4 of an adjoining surface in FIG. 3 (because each obstacle 3E, 4, 3I has a pressure side and a suction side).

Hereafter in the description, the example is taken of two surfaces S with reference symbols SI and SE. More precisely, two couples of consecutive obstacles {3I, 4} and {4, 3E} can be defined (the obstacle 4 being common to both couples), and the surfaces SI and SE are two distinct surfaces, respectively called first and second surfaces, each advantageously conforming to the invention, and extending between the two obstacles of each of the two couples respectively.

Figure 4A:
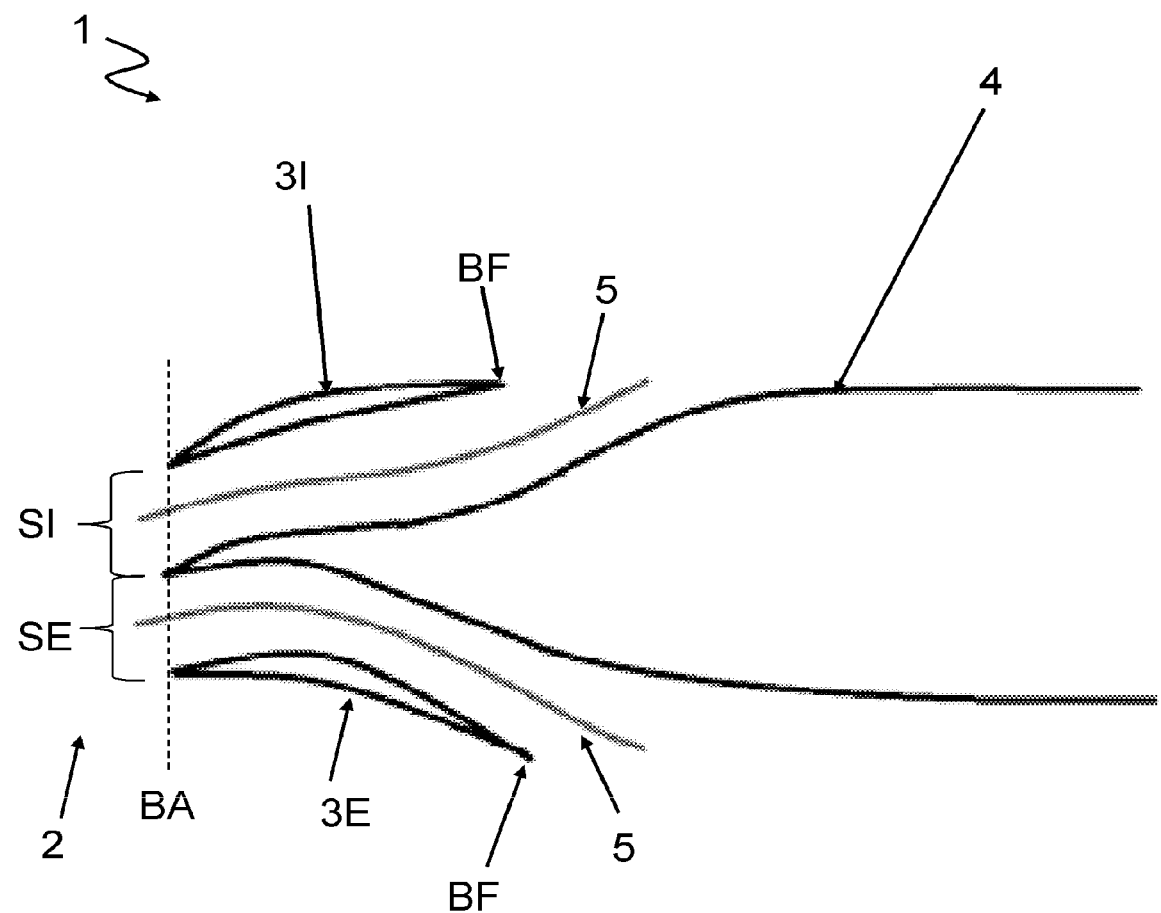
FIGS. 4a-4b show two examples of geometries of a part according to two embodiments of the invention.
Figure 4B:
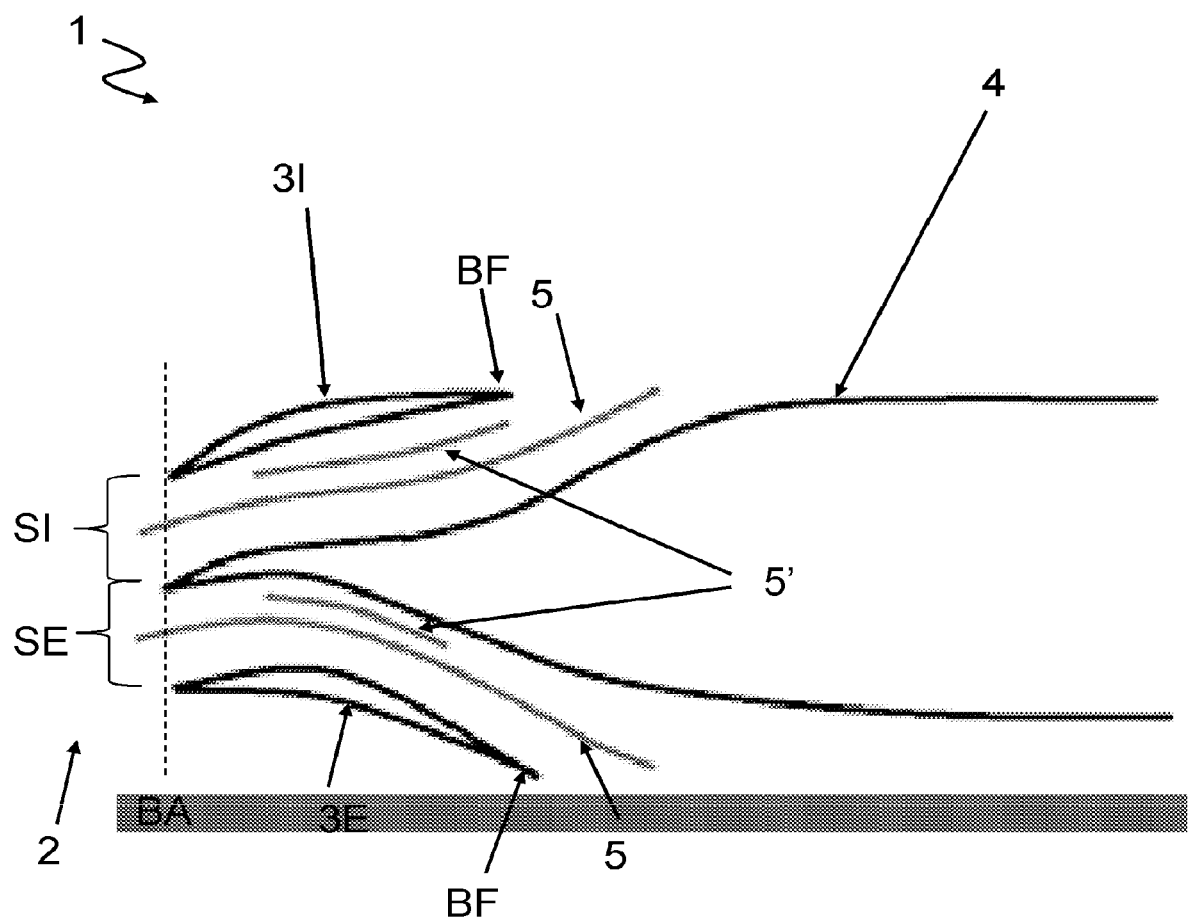

Preferably, and in conformity to the preferred embodiments illustrated in FIGS. 4a, 4b, the common obstacle is a bifurcation 4, which means that the surfaces SE and SI extend respectively to the pressure side and to the suction side of the bifurcation 4 (it will be understood in fact that the reference symbols SI and SE are designated by proximity with the obstacles 3I and 3E to facilitate reading the text, and not to signify "suction side/pressure side surface"). In other words:

the blade 3I is the first obstacle of the first surface SI;
the bifurcation 4 is the second obstacle of the first surface SI and the first obstacle of the second surface SE;
the blade 3E is the second obstacle of the second surface SE.

Fin

The non-axisymmetric surface(s) SE, SI of the present part are remarkable in that they define at least one fin 5 with a substantially triangular cross-section.

By "substantially triangular section" is meant that the fins 5 have two oblique faces which rejoin on a dorsal ridge, either at an angle or by a tangent connection. The two faces themselves connect to the stream (remainder of the surface S) either by a right angle or by a tangent connection. Each fin 5 can also have tapered ends.

It is noted that the fact of disposing the fins between two blades of a part is known. But known fins generally are flat "strips" (see for example patent applications EP1927723, JP6022002, U.S. Pat. No. 4,023,350), or bumps (see document EP2194232), i.e. in no way substantially triangular fins in the sense of the present invention. In fact, these known elements (which are generally numerous) only have the role of acting as a barrier to the incident flow, and generating vortices.

Application WO2015092306, for its part, proposes real fins with a substantially triangular section with the role of guiding the air flow, designed for a compressor stage. This geometry is suitable for an OGV stage but proves to be ineffective at the eagle's beak.

The present fins 5 are distinguished from those of document WO2015092306 in their position in the stream. In fact, where the latter are positioned preferably downstream with respect to the fluid flow direction, the present fin(s) 5 extend further upstream than the obstacles 3I, 4, 3E.

More precisely, each fin 5 is associated with a leading position and a trailing position on the surface S, between which the fin 5 extends, such that:

said leading position is upstream of each of the leading edges BA of the adjoining obstacles 3I, 4, 3E;
said trailing position is downstream of each of the leading edges BA.

More precisely, and as will be seen in detail later, each obstacle 3I, 4, 3E has a leading edge BA and a trailing edge BF. Preferably and as explained, all the obstacles 3I, 4, 3E have leading edges BA with substantially identical axial positions (i.e. along the longitudinal axis of the turbine engine), and trailing edges BF with different axial positions depending on the type of obstacle. More precisely, while all the obstacles of the blade type 3I, 3E have trailing edges BF with substantially identical positions, the obstacles of the bifurcation 4 type have trailing edges BF distinctly downstream of the trailing edges BF of the blades 3I, 3E.

Thus, for a couple of consecutive obstacles 3I, 4, 3E, the fin 5 between them starts upstream of the two leading edges BA of the couple of obstacles and terminates downstream of these two leading edges BA.

Preferably, there is (are) one or two fins 5 on the stream (a maximum of three), preferably two as can be seen in the figures.

The applicant has in fact noted that the present fins 5 "advanced upstream" are proven to be very effective for avoiding large separations at the foot, particularly for OGV blades around the bifurcations which are heavily loaded.

Moreover, this geometry allows continuity with other fins to be ensured (in particular of the type of those of document WO2015092306) between the blades of the OGV, far from the bifurcations. This continuity preserves the capacity of the fins to reduce the corner vortex and passage flow.

Preferably, each fin 5 extends substantially axially in the stream (and no substantially azimuth, as could be noted for bumps in the state of the art), or has a trace (i.e. a trajectory) corresponding to the mean skeleton line of the first and second obstacles 3I, 4, 3E.

It should be noted that the fins 5 offer another advantage: they can be used as heat exchangers to help in cooling the part 1.

Double Surface

In the preferred embodiment where an obstacle is a bifurcation 4, as explained, preferably two surfaces S, including a first surface SI and a second surface SE, conforming to the invention (i.e. having at least one occurrence of said fin 5) are defined. The bifurcation 4 is between the two surfaces SI and SE (and the assembly is flanked by the two blades 3I and 3E).

For the first surface SI, a first blade 3I constitutes the first obstacle (i.e. presents its pressure side to it), and the bifurcation 4 constitutes its second obstacle (i.e. presents its suction side to it). For the second surface SE, the bifurcation 4 constitutes its first obstacle (i.e. presents is pressure side to it), and a second blade 3E constitutes its second obstacle (i.e. presents its suction side to it).

This can be summarized by saying that in this double embodiment, the part or the set of parts 1 comprises at least three obstacles 3I, 4, 3E, including in succession a first blade 3I, a bifurcation 4 and a second blade 3E, each having a leading edge BA and a trailing edge BF, and a platform 2 from which extend the obstacles 3I, 4, 3E; and having:

between the pressure side of the first blade 3I and the suction side of the bifurcation 4, a first surface SI, and between the pressure side of the bifurcation 4 and the suction side of the second blade 3E, a first surface SE, each of the first and second surfaces SE, SI being non-axisymmetric and defining at least one fin 5 with a substantially triangular section, each fin 5 being associated with a leading position and a trailing position on the surface SI, SE between which the fin 5 extends, such that:

said leading position is upstream of each of the leading edges BA;

said trailing position is downstream of each of the leading edges BA.

Dimensions and Position

The fins 5 advantageously have a length comprised between 5% and 40% (preferably between 10% and 15%) of the distance between the pressure side of the first obstacle 3I and the suction side of the second obstacle 3E. The width considered here is the maximum width of the base of the fin 5 (which is substantially constant, except at possible leading and trailing tapers). This width and the distance between the pressure side of the first obstacle 3I, 4 and the suction side of the second obstacle 4, 3E are preferably evaluated along planes parallel to the end planes (in other words, along the construction curves mentioned previously). The width will be on the order of 30% or 40% for example, for small spacing between the obstacles.

Preferably, each fin 5 has for example a height comprised between 0.5% and 5% of a height of each of the obstacles 3I, 4, 3E. The fin height can even be up to 15% of the height of each of the obstacles 3I, 4, 3E. In the preferred embodiment of an OGV stage, all the obstacles 3I, 4, 3E are fixed and have the same height. However, the fin can have a variable height, increasing regularly for example between 0.5% and 15% from upstream to downstream.

As explained, each fin 5 in particular is defined by two end points: one leading position and one trailing position on the surface S, between which the fin 5 extends (in particular following the skeleton of the obstacles 3I, 4, 3E).

The leading position is defined within the reference frame of the turbine engine by coordinates $X_{BA}$ and $Y_{BA}$, and the trailing position by coordinates $X_{BF}$ and $Y_{BF}$. These coordinates are respectively an axial coordinate (i.e. along a longitudinal axis of the turbine engine oriented along the direction of motion of the gas flow) and an azimuth coordinate (i.e. along an axis orthogonal to both the longitudinal direction of the turbine engine and the radial direction at the point considered, i.e. along a direction tangent to the surface S but orthogonal to the longitudinal direction) of the position. In FIGS. 4a and 4b, the longitudinal and azimuth axes are respectively oriented toward the right and toward the top of the figure. The radial axis is normal to the plane shown.

The first coordinate X thus designates an (axial) position along an obstacle chord extending from a leading edge BA to a trailing edge BF of the most "upstream" obstacle, expressed in relative length (in other words, X=0 corresponds to an alignment to the leading edges BA and X=1 corresponds to an alignment with the most upstream trailing edge BF of the trailing edges BF of the obstacles 3I, 4, 3E, i.e. that of a blade 3E, 3I and not of a bifurcation 4).

These positions are such that:

the (axial) leading position is situated upstream of each of the leading edges BA (i.e. $X_{BA}<0$) and the trailing (axial) position is situated downstream of each of the leading edges BA (i.e. $X_{BF}>0$);

And preferably, these positions are such that:

the difference between the (axial) leading position and the axial position of each of the leading edges BA is a maximum of 15% of the relative length of the obstacle chord 3I, 4, 3E extending from the leading edge BA to the trailing edge BF of the obstacle 3I, 4, 3E having the most upstream trailing edge BF (i.e. $X_{BA} \in [-0.15; 0[$), and the (axial) trailing position situated at 50% at least (preferably at least 100%) of the relative length of the obstacle chord 3I, 4, 3E (i.e. $X_{BF}>0.5$, or $X_{BF}>1$). It will be understood that if the trailing position is situated at 100% at least of the relative chord length, then it is downstream of the trailing edge BF of the obstacle 3I, 4, 3E having the most upstream trailing edge BF, i.e. that the fin 5 extends axially downstream of the trailing edge BF of an obstacle of the blade type, as can be seen for example in FIG. 4a.

When one of the first and second obstacles is a bifurcation 4, as explained, it has a maximum curvature point (associated with an axial position $X_{Cmax}$) on its face facing the fin 5, generally beyond the trailing edge BF of the blade 3E, 3I which constitutes the other obstacle adjoining the fin 5 (i.e. the most upstream obstacle). We therefore have $X_{Cmax}>1$ Said trailing position of the fin 5 extends advantageously substantially up to said maximum curvature point of the bifurcation 4, i.e. $X_{BF} \approx X_{Cmax}$, as can be seen in the example of FIG. 4a.

The second coordinate Y designates an (azimuth) position along a channel width extending from the pressure side of the first obstacle 3I, 4 to the suction side of the second obstacle 3I, 4, expressed in relative length (in other words, Y=0 corresponds to a point between the pressure side of the first obstacle 3I, 4 and Y=1 corresponds to a point against the suction side of the second obstacle 4, 3E).

And preferably, these positions are such that each of the leading and trailing positions associated with a fin 5 is situated at a distance from the pressure side of the first obstacle 3I, 4 comprises between 10% and 55% of the channel width (i.e. $Y_{BA}, Y_{BF} \in [0.1, 0.55]$). The fin(s) 5 can therefore be distributed in balanced fashion in the stream, but are preferably closer on average to the pressure side of the first obstacle 3I, 4, see FIG. 4b.

In the case of a single fin 5, preferably it will be substantially centered in the stream (see FIG. 4a).

Moreover, a person skilled in the art will be able to use the advantageous features of the fins of application WO2015092306, adapting them if necessary according to his general knowledge.

Number of Fins

The best results are obtained for one or two fins 5. It is desirable to not exceed three fins 5.

With two fins, these can be disposed in the middle of each of the portion of the platform 2 (as can be seen in FIG. 2), but preferably the fins 5 can, as explained, be preferably on the side of the stream near the pressure side obstacle 3I, 4.

In the preferred embodiment of FIG. 4b, a main fin 5 is disposed in the middle of the stream, and a shorter secondary fin 5' (and further downstream: its leading position is not necessarily upstream of the leading edge BA of the obstacles 3I, 4, 3E) is disposed at the suction side of the main fin 5.

In the case where one of the fins 5 is disposed in the middle of the stream (leading and trailing positions associated with the fin 5 situated at a distance from the pressure side of the first obstacle 3I, 4 at approximately 50% of the channel width), it is possible to use the structure of the platform 2 to reconstitute this fin 5. Thus, if the platform 2 comprises a first platform portion from which the first blade 3I extends and a second platform portion from which the second blade 3E extends (i.e. platform 2 formed of a plurality of elementary members each supporting an obstacle 3I, 4, 3E), the connection between these two consecutive portions of the platform 2 can be designed to correspond to the trace of the fin 5.

A protruding inter-platform joint of suitable shape can then form the fin 5.

This solution has numerous advantages, because it necessitates only a few modifications with respect to known parts and can facilitate the mounting/dismounting by allowing greater tangential clearances between the portions of the platform 2.

Alternatively or complementarily, at least one fin 5 is inherent in the surface S.

The invention claimed is:

1. A turbine engine part or set of parts comprising:
    first and second obstacles each having a leading edge and a trailing edge; and
    a platform from which the obstacles extend,
    one of the first and the second obstacle being a blade and the other being a bifurcation having a trailing edge downstream of the leading edge of said blade, the bifurcation having on a pressure side thereof or a suction side thereof facing said blade a maximum curvature point downstream of the trailing edge of said blade,
    wherein the platform has, between the pressure side of the first obstacle and the suction side of the second obstacle a nonaxisymmetric surface defining at least one fin with a substantially triangular cross-section, each fin being associated with a leading position and a trailing position on the surface, between which the fin extends, such that:
        said leading position is upstream of each of the leading edges, and
        said trailing position extends axially up to said maximum curvature point of the bifurcation.

2. The part or set of parts according to claim 1, wherein the fin has a height comprised between 0.5% and 15% of a height of each of the obstacles.

3. The part or set of parts according to claim 1, wherein said leading position extends upstream of each of the leading edges by up to 15% of a relative length of an obstacle chord extending from the leading edge to the trailing edge of the obstacle having a most upstream trailing edge.

4. The part or set of parts according to claim 1, comprising at least two blades, including a first blade and a second blade, the platform having at least two non-axisymmetric surfaces each defining said fin with a substantially triangular cross-section, including a first surface for which the first blade forms the first obstacle and the bifurcation the second obstacle, and a second surface for which the bifurcation forms the first obstacle and the second blade the second obstacle.

5. The part or set of parts according to claim 1, wherein each fin has a trace corresponding to a mean skeleton line of the first and second obstacles.

6. The part or set of parts according to claim 1, wherein the surface defines one or two fins side by side.

7. The part or set of parts according to claim 4, wherein each of the first and second surfaces further defines a secondary fin shorter than the fin and situated at the suction side of said fin.

8. The part or set of parts according to claim 1, wherein the platform has an annular shape along which are regularly disposed a plurality of obstacles.

9. The part or set of parts according to claim 8, being a secondary flow guide vane.

10. A turbine engine comprising a part or set of parts according to claim 1.

* * * * *